United States Patent
Gray

(10) Patent No.: US 7,273,260 B2
(45) Date of Patent: Sep. 25, 2007

(54) ELECTRONIC BREAKAWAY DEVICE

(75) Inventor: Jonathan S. Gray, Garnett, KS (US)

(73) Assignee: Hopkins Manufacturing Corporation, Emporia, KS (US)

( * ) Notice: Subject to any disclaimer, the term of this patent is extended or adjusted under 35 U.S.C. 154(b) by 589 days.

(21) Appl. No.: 10/365,905

(22) Filed: Feb. 13, 2003

(65) Prior Publication Data

US 2004/0160116 A1 Aug. 19, 2004

(51) Int. Cl.
*B60T 7/20* (2006.01)

(52) U.S. Cl. .................. 303/124; 303/7; 188/3 R

(58) Field of Classification Search .......... 303/3, 303/20, 124, 7, 15; 188/3 R
See application file for complete search history.

(56) References Cited

U.S. PATENT DOCUMENTS

| | | | |
|---|---|---|---|
| 2,349,167 A * | 5/1944 | Gunderson | 188/3 R |
| 2,867,294 A * | 1/1959 | Sturdivant | 188/3 R |
| 3,062,326 A * | 11/1962 | Jones et al. | 188/3 R |
| 3,907,071 A * | 9/1975 | Wells | 188/3 R |
| 4,052,695 A * | 10/1977 | Myers | 340/431 |
| 4,066,996 A * | 1/1978 | Davis | 340/431 |
| 4,072,362 A * | 2/1978 | Van Anrooy | 303/7 |
| 4,398,771 A * | 8/1983 | McCurry et al. | 303/15 |
| 4,685,744 A * | 8/1987 | Luce | 303/89 |
| 4,938,542 A * | 7/1990 | Kline et al. | 303/20 |
| 5,289,103 A * | 2/1994 | Eccleston | 320/144 |
| 6,068,352 A * | 5/2000 | Kulkarni et al. | 303/20 |
| 6,407,353 B1 * | 6/2002 | Fritzinger et al. | 200/334 |
| 6,416,138 B1 * | 7/2002 | Barnett | 303/116.2 |
| 6,499,814 B1 * | 12/2002 | Mixon | 303/124 |
| 6,933,463 B2 * | 8/2005 | Yamaguchi et al. | 219/121.57 |
| 2003/0168908 A1 * | 9/2003 | Robinson et al. | 303/7 |
| 2004/0124697 A1 * | 7/2004 | MacGregor et al. | 303/89 |

* cited by examiner

*Primary Examiner*—Devon Kramer
(74) *Attorney, Agent, or Firm*—Hovey Williams LLP

(57) ABSTRACT

A breakaway device (10) to detect when a towed vehicle (14) separates from a towing vehicle (16) in order to engage the towed vehicle's brakes broadly comprises a sensor operable to detect when a signal from the towing vehicle (16) is lost and a shunt operable to route electrical power to the brakes. In a preferred embodiment, the sensor and the shut may be embodied in a transistor (26). In an alternative embodiment, the sensor and the shut may be embodied in an electro-mechanical switch (34). The device (10) preferably includes an override (42) and lights (44,46) to indicate the device's (10) status.

27 Claims, 3 Drawing Sheets

ELECTRONIC BREAKAWAY DEVICE

BACKGROUND OF THE INVENTION

1. Field of the Invention

The present invention relates to breakaway devices. More particularly, the present invention relates to a breakaway device that can automatically and reliably engage a towed vehicle's brakes when the towed vehicle separates from a towing vehicle.

2. Description of Prior Art

Towed vehicles, such as trailers, are often heavily loaded and towed behind towing vehicles, such as trucks. Occasionally, a trailer will break away and become separated from a truck. When this happens, the trailer becomes out of control and presents a serious hazard to the trailer's contents, as well as other vehicles in the road. Therefore, many trailers include electrically operated brakes and batteries to power the brakes in the event they become uncontrolled.

Such systems typically use plunger switches to engage the brakes. Plunger switches typically consist of two contacts physically held apart by a plunger. When a plunger is pulled from a plunger switch, the switch's contacts close completing a electrical current path.

Unfortunately, plunger switches are subject to corrosion and are therefore often unreliable. Plunger switches are also difficult to operate and are rarely tested. Furthermore, plunger switches are actuated by pull cables, which are often connected improperly. Finally, pull cables are also subject to corrosion and frequently break when they are used to actuate a plunger switch. For these and other reasons, plunger switches are simply unreliable and do not ensure a trailer's brakes will be engaged in an emergency.

Accordingly, there is a need for an improved breakaway device that overcomes the limitations of the prior art.

SUMMARY OF THE INVENTION

The present invention overcomes the above-identified problems and provides a distinct advance in the art of emergency breaks for towed vehicles. More particularly, the present invention provides a breakaway device that can automatically and reliably engage a towed vehicle's brakes when the towed vehicle separates from a towing vehicle. The breakaway device is preferably part of a wiring harness that is designed to allow equipment mounted to the towed vehicle to be operated by signals received from the towing vehicle.

The brakes are preferably electrically operated and may be used for normal operation and/or emergencies. For example, if the towed vehicle separates from the towing vehicle, the towed vehicle would be out of control and may no longer receive the signals from the towing vehicle. In such an emergency, it is helpful to automatically engage the brakes, in order to decelerate the towed vehicle. Thus, the towed vehicle preferably includes an on-board battery that can be used to engage the brakes independently of the towing vehicle.

The device is designed to detect when the towed vehicle separates from the towing vehicle and then engage the brakes. A preferred first embodiment of the device comprises a metal-oxide semiconductor field-effect transistor (MOSFET). A gate of the MOSFET is preferably electrically coupled to a signal received from the towing vehicle that is expected to be energized at all times. With the gate energized in this manner, the MOSFET prevents current flow from the battery to the brakes.

If the towed vehicle becomes separated from the towing vehicle, the harness will be pulled from the towing vehicle. In this manner, the signal will be lost and the gate will become de-energized. With the gate de-energized, current is allowed to flow from the battery to the brakes, thereby engaging the brakes and decelerating the towed vehicle.

A preferred second embodiment of the device comprises a electro-mechanical switch, such as a solenoid or a relay. A coil of the switch is preferably electrically coupled to the signal received from the towing vehicle. With the coil energized in this manner, the switch is held open preventing current flow from the battery to the brakes. If the harness is pulled from the towing vehicle, the signal will be lost and the coil will become de-energized. With the coil de-energized, the switch closes allowing current to flow from the battery to the brakes, thereby engaging the brakes and decelerating the towed vehicle.

It should be obvious that any time the towed vehicle is separated from the towing vehicle, as described above, current will flow from the battery, through the device, and to the brakes. However, such current flow may quickly drain the battery. Additionally, it may be desirable to reposition the towed vehicle while separated from the towing vehicle, which may be inhibited with the brakes engaged. For these reasons, the device preferably includes an override. In its simplest form, the override may be a disconnect wired in series with the remainder of the device. In this manner, current can be prevented from flowing through the device to the brakes.

Alternatively, the override may comprise a timer that allows current to flow from the battery, through the device, and to the brakes for a specified time period. Once the time period has elapsed, the override interrupts current flow to the brakes, thereby preserving the battery and allowing the towed vehicle to be repositioned. In this case, the override may be reset by either pressing a button or providing the signal.

In addition, the device may provide some indication of whether the brakes are engaged. For example, if the device detects the signal, the device may illuminate a first light. Alternatively, if the device loses the signal, the device may illuminate a second light. While the first and second lights are preferably integral to the harness, they may be mounted anywhere on the towed vehicle. For example, the first and second lights may be mounted such that they are visible from within the towing vehicle.

In use, a user connects a towed vehicle and a harness to a towing vehicle. The user may then confirm that the device is functioning properly by observing the lights. If the towed vehicle becomes separated from the towing vehicle, the harness will be pulled from the towing vehicle, thereby interrupting a signal received from the towing vehicle. In response, the device automatically engages the towed vehicle's brakes and safely decelerates the towed vehicle.

Use of the device requires no additional steps beyond those used in connecting the towed vehicle to the towing vehicle. Thus, the device cannot be forgotten and unused. Additionally, the device is fail-safe. For example, if any portion of the device or the harness is damaged, the signal will likely be lost, thereby engaging the brakes.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

Figure 1:
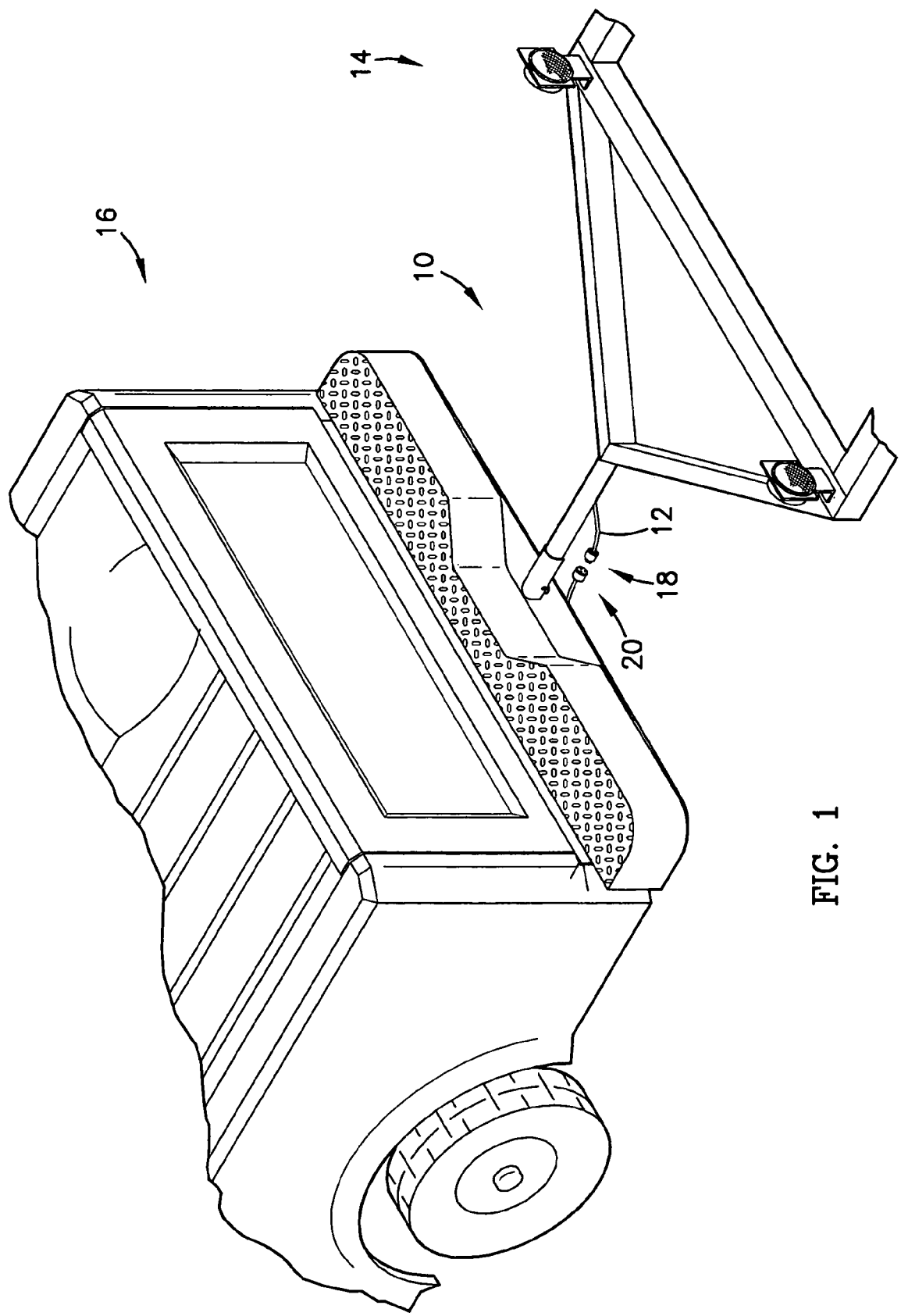
FIG. 1 is a perspective view of a breakaway device constructed in accordance with a preferred embodiment of the present invention and illustrated as part of a wiring harness.

Referring to FIG. 1, a breakaway device 10 constructed in accordance with a preferred embodiment of the present invention is illustrated as part of a wiring harness 12 of a towed vehicle 14 pulled by a towing vehicle 16. The harness 12 is preferably physically secured to the towed vehicle 14 and designed to allow equipment mounted to the towed vehicle 14 to be operated by signals received from the towing vehicle 16. Thus, the harness 12 preferably includes a plug 18 designed to electrically couple with a socket 20 of the towing vehicle 16.

The towed vehicle 14 may be a trailer, a boat, a camper or any other vehicle that can be towed behind another vehicle. For example, the towed vehicle 14, may be a conventional trailer which includes a chassis supported by at least one axle and two wheels. In addition, the chassis preferably includes one or more lights, such as running lights, marker lights, and/or stops lights. When the towing vehicle 16 attempts to slow down, a stop light signal may illuminate stop lights on the towing vehicle 16. The stop light signal may also be communicated through the socket 20, the plug 18, and the harness 12 to illuminate stop lights on the towed vehicle 14.

Figure 2:
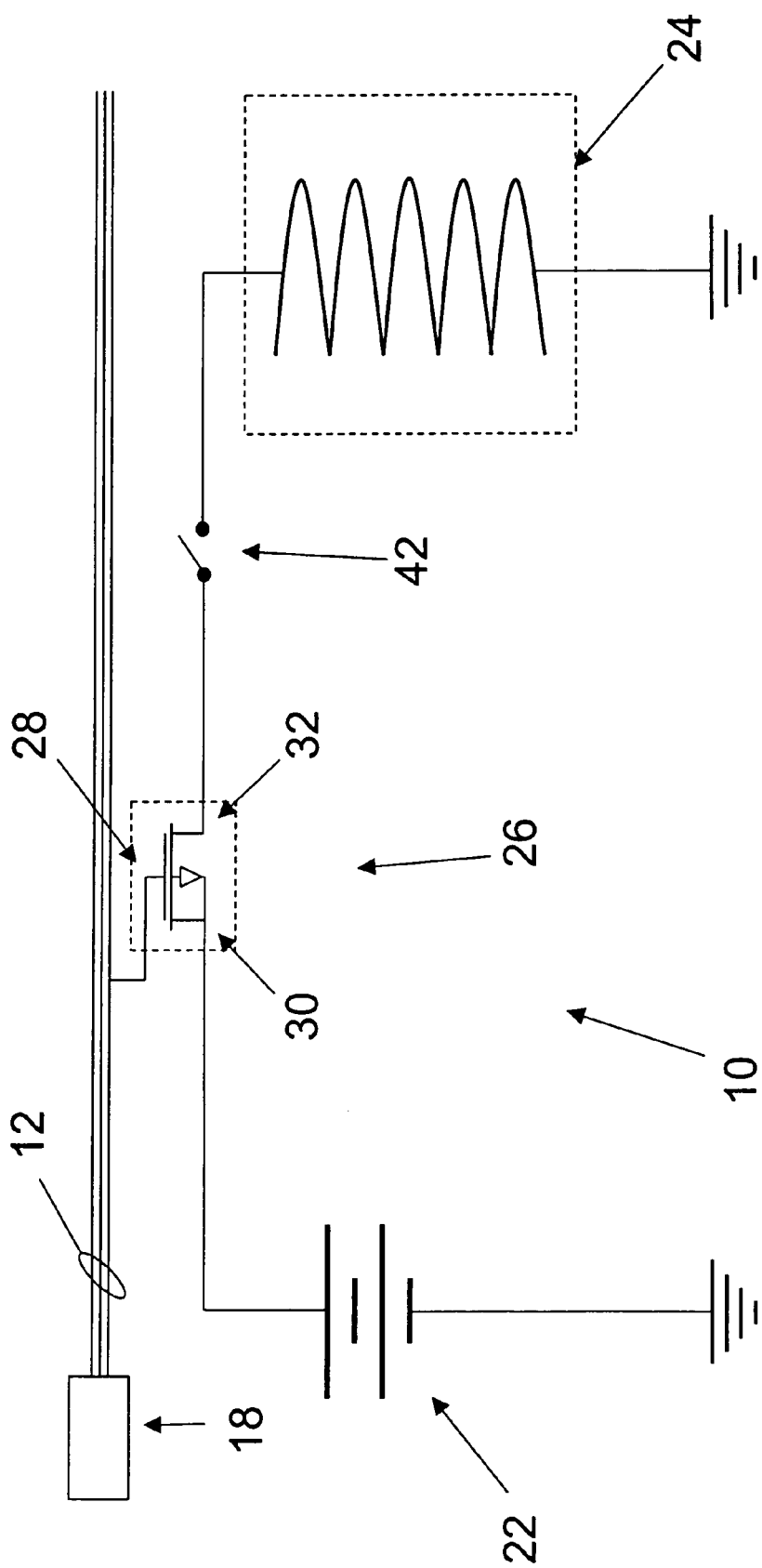
FIG. 2 is a schematic diagram of a preferred first embodiment of the device.

Referring also to FIG. 2, the chassis preferably supports a load to be pulled by the towing vehicle 16 and includes electrically controlled brakes that may be actuated by an on-board battery 22, or other electrical power source. The stop light signal described above may also be used to engage the brakes on the towed vehicle 14. Alternatively, a brake signal may be received from the towing vehicle 16 in order to engage the brakes. In any case, the brakes preferably include a solenoid 24 or other actuator designed to convert electrical current received from the battery 22 into mechanical force in order to decelerate the towed vehicle 14.

It should be noted that the brakes may be used for normal operation, such as that described above. Additionally, the brakes may be used for emergencies. For example, if the towed vehicle 14 separates from the towing vehicle 16, the towed vehicle 14 would become out of control and may no longer receive the signals from the towing vehicle 16. In such an emergency, it is helpful to automatically engage the brakes, in order to decelerate the towed vehicle 14. In this case, the battery 22 can be used to energize the solenoid 24 and engage the brakes independently of the towing vehicle 16.

The device 10 is designed to detect when the towed vehicle 14 has separated from the towing vehicle 16 and then engage the brakes. A preferred first embodiment of the device 10 comprises a metal-oxide semiconductor field-effect transistor (MOSFET) 26. A gate 28 of the MOSFET 26 is preferably electrically coupled to a signal received from the towing vehicle 16 that is expected to be energized at all times. For example, an auxiliary power signal received from the towing vehicle 16 and used to substantially continuously provide power to the towed vehicle 14 may also be used to energize the gate 28, while the towed vehicle 14 is connected to the towing vehicle 16. With the gate 28 energized in this manner, the MOSFET 26 prevents current flow from the battery 22 to the solenoid 24.

If the towed vehicle 14 becomes separated from the towing vehicle 16, the harness 12 will pull the plug 18 from the socket 20. In this manner, the auxiliary power signal will be lost and the gate 28 will become de-energized. With the gate 28 de-energized, current is allowed to flow from the battery 22 to the solenoid 24, thereby engaging the brakes and decelerating the towed vehicle 14. More specifically, a source 30 of the MOSFET 26 may be electrically coupled with the battery 22 while a drain 32 of the MOSFET 26 may be electrically coupled with the solenoid 24. In this case, with the gate 28 de-energized, current flows from the battery 22, into the source 30, out of the drain 32, and to the solenoid 24. Thus, the gate 28 functions as a sensor while the source 30 and the drain 32 function as a shunt. Using the MOSFET 26, the device 10 detects a loss of voltage normally associated with the auxiliary power signal received from the towing vehicle 16 and energizes the solenoid 24, thereby engaging the brakes.

Alternatively, the MOSFET 26 may trigger an interposing relay. For example, the MOSFET 26 may be wired in series with a coil of the relay while a set of contacts of the relay may be electrically coupled between the battery 22 and the solenoid 24. With the gate 28 de-energized, current flows through the MOSFET 26 and the coil, thereby closing the contacts of the relay. Current also flows from the battery 22, through the contacts, and to the solenoid 24. In this case, the MOSFET functions as the sensor while the relay functions as the shunt. Using the interposing relay, the device 10 may deliver more current to the solenoid 24 than may safely flow through the MOSFET 26.

Figure 3:
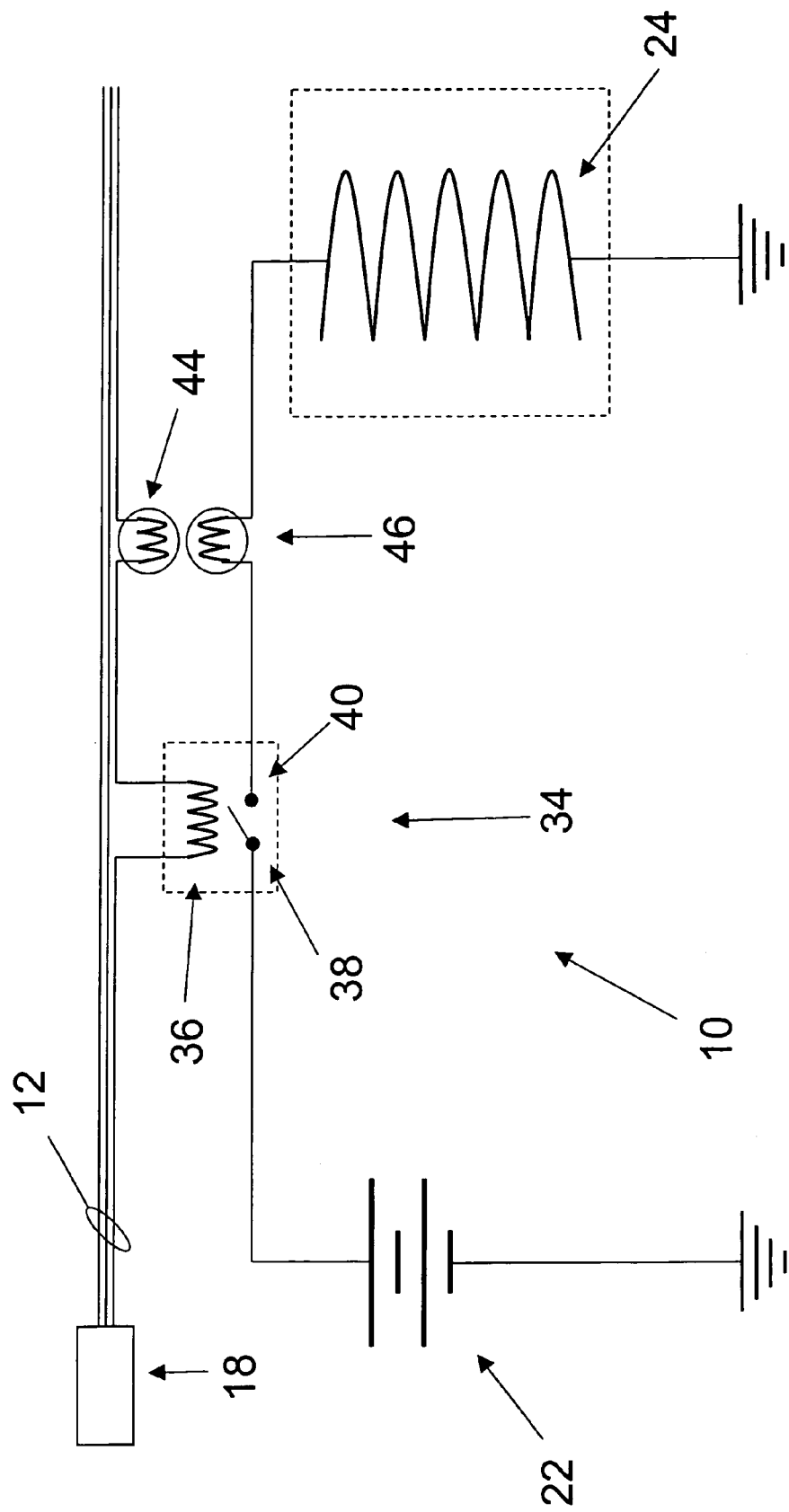
FIG. 3 is a schematic diagram of a preferred second embodiment of the device.

Referring also to FIG. 3, a preferred second embodiment of the device 10 comprises an electro-mechanical switch 34. A coil 36 of the switch 34 is preferably electrically coupled to the auxiliary power signal received from the towing vehicle 16. For example, the coil 36 may be wired either in series or parallel with the auxiliary power signal to the towed vehicle 14. In either case, the coil 36 is preferably energized whenever the auxiliary power is energized. With the coil 36 energized in this manner, the switch 34 is held open preventing current flow from the battery 22 to the solenoid 24.

If the harness pulls the plug 18 from the socket 20, the auxiliary power signal will be lost and the coil 36 will become de-energized. With the coil 36 de-energized, the switch 34 closes allowing current to flow from the battery 22 to the solenoid 24, thereby engaging the brakes and decelerating the towed vehicle 14. More specifically, a first contact 38 of the switch 34 may be electrically coupled with the battery 22 while a second contact 40 of the switch 34 may be electrically coupled with the solenoid 24. In this case, with the coil 36 de-energized, current flows from the battery 22, through the contacts 38,40, and to the solenoid 24. In this case, the coil 38 acts as the sensor and the contacts 38,40 act as the shunt. Alternatively, the switch 34 may be used with the relay, as described above. Using the switch 34, the device 10 detects a loss of current normally associated with the auxiliary power signal received from the towing vehicle 16 and energizes the solenoid 24, thereby engaging the brakes.

It should be obvious that any time the towed vehicle 14 is separated from the towing vehicle 16, as described above, current will flow from the battery 22, through the device 10, and to the solenoid 24. However, such current flow may quickly drain the battery 22. Additionally, it may be desirable to reposition the towed vehicle 14 while separated from the towing vehicle 16, which may be inhibited with the brakes engaged. For these reasons, the device 10 preferably includes an override 42, such as that shown in FIG. 2. In its simplest form, the override 42 may be a disconnect wired in series with the shunt. In this manner, current can be prevented from flowing through the device 10 to the solenoid 24.

Alternatively, the override 42 may comprise a timer that allows current to flow from the battery 22, through the device 10, and to the solenoid 24 for a specified time period after the towed vehicle 14 becomes separated. Once the time period has elapsed, the override 42 interrupts current flow to the solenoid 24, thereby preserving the battery 22 and allowing the towed vehicle 14 to be repositioned. In this case, the override 42 may be reset by either pressing a button or placing the plug 18 into the socket 20, thereby providing the auxiliary power signal.

In addition, the device 10 may provide some indication of whether the brakes are engaged. For example, as shown in FIG. 3, if the device 10 detects the auxiliary power signal, the device 10 may illuminate a first light 44. Alternatively, if the device 10 loses the auxiliary power signal, the device 10 may illuminate a second light 46. While the first and second lights 44,46 are preferably integral to the harness 12, they may be mounted anywhere on the towed vehicle 14. For example, the first and second lights 44,46 may be mounted such that they are visible from within the towing vehicle 16.

The device 10 has been described as sensing when the auxiliary power signal is lost. It should be obvious that the device 10 may be used with other signals received from the towing vehicle 16. For example, a safety signal may be received from the towing vehicle 16 exclusively to energize the gate 28 or the coil 36. Additionally, the safety signal may be received by a sensing circuit designed exclusively for detecting the safety signal using logic circuitry and energizing the gate 28 or the coil 36 upon loss of the safety signal using the MOSFET 26. Furthermore, the sensing circuit may be used to detect that the harness 12 is connected to the towing vehicle 16 without interfering with the signals received from the towing vehicle 16. For example, the sensing circuit may incorporate a current transformer (CT) that senses current flow through the harness 12 without actually being wired into the harness 12.

Alternatively, the sensing circuit may actually measure a distance between the towed vehicle 14 and the towing vehicle 16. For example, the sensing circuit may use radio direction and ranging (RADAR) principles or a laser range finder to measure the distance. In either case, when the distance suddenly changes, or simply increases, the device 10 may engage the brakes by allowing current to flow from the battery 22 to the solenoid 24.

It can be seen that use of the device 10 may not require a user to take any action he or she would not normally take in connecting the towed vehicle 14 to the towing vehicle 16. Thus, the device 10 is not susceptible to being forgotten by the user. Additionally, the device 10 may operate using signals normally received from the towing vehicle 16 and may not require modification of the towing vehicle 16.

Furthermore, if the signals normally received from the towing vehicle 16 are functional, the device 10 is likely functional. Conversely, if the device 10 is functional, then the signals normally received from the towing vehicle 16 are likely functional. In this manner, the device 10 may operate as a safety check of the signals normally received from the towing vehicle 16.

Finally, neither the MOSFET 26, the switch 34, nor the relay are susceptible to corrosion, since they may be sealed. Thus, no moving parts are required to be exposed to corrosion. Additionally, the device 10 is fail-safe. For example, if any portion of the device 10 or the harness 12 is damaged, the sensor will likely lose the auxiliary power signal or the safety signal and actuate the shunt, thereby engaging the brakes.

While the present invention has been described above, it is understood that substitutions may be made. For example, instead of sensing voltage with the MOSFET 26, the device 10 may detect current flowing from the towing vehicle using a bipolar junction transistor. Additionally, portions of the device 10, such as the first and second lights 44,46, may be adapted to reside on the towing vehicle 16. Furthermore, the device 10 may be supplied as part of the towed vehicle 14 or an assembly that may be installed on the towed vehicle 14 in order to provide the functionality described. As such, the device 10 may be supplied with the harness 12 or a portion thereof. Thus, the harness 12, as supplied with the device 10, may provide substantially all or only a portion of the towed vehicle's 14 electrical interconnections. These and other minor modifications are within the scope of the present invention.

In use, the user connects the towed vehicle 14 to the towing vehicle 16 and inserts the plug 18 into the socket 20. The user may then confirm that the device 10 is functioning properly by observing the first and second lights 44,46. Alternatively, the user may attempt to move the towed vehicle 14 with and without the plug 18 in the socket 20. If the towed vehicle 14 becomes separated from the towing vehicle 16, the harness 12 will pull the plug 18 from the socket 20, thereby interrupting the running signal light received from the towing vehicle 16. In response, the device 10 automatically allows current to flow from the battery 22 to the solenoid 24, thereby engaging the brakes and safely decelerating the towed vehicle 14.

Having thus described a preferred embodiment of the invention, what is claimed as new and desired to be protected by Letters Patent includes the following:

1. A breakaway device operable to engage a towed vehicle's brakes when the towed vehicle separates from a towing vehicle, the device comprising:
   a sensor operable to electrically detect an open circuit between the towed vehicle and the towing vehicle by detecting a loss of voltage in a wiring harness of the towed vehicle; and
   a shunt actuated in response to the sensor and operable to electrically engage the towed vehicle's brakes,
   wherein the shunt is a drain and a source of a MOSFET and the sensor is a gate of the MOSFET connected substantially directly to a wire of the harness.

2. The device as set forth in claim 1, the device comprising a transistor that electrically couples a power source and a solenoid of the brakes when a signal to the transistor is lost.

3. The device as set forth in claim 1, wherein the shunt is electrically connected between a power source and a solenoid of the brakes such that current flows through the shunt to energize the solenoid when the towed vehicle separates from the towing vehicle.

4. The device as set forth in claim 1, further including an override operable to disengage the brakes while the towed vehicle is separated from the towing vehicle.

5. The device as set forth in claim 4, wherein the override automatically disengages the brakes once a timer has lapsed.

6. The device as set forth in claim 4, wherein the override prevents current from flowing through the device.

7. An assembly operable to be installed on a towed vehicle with electrically controlled brakes and receive signals from a towing vehicle, the assembly comprising:
- a wiring harness operable to be physically secured to the towed vehicle;
- a plug operable to electrically couple the harness with the towing vehicle;
- a breakaway device operable to monitor an electrical condition of the harness and engage the brakes when the plug becomes disconnected from the towing; and
- a sensor operable to electrically detect when the towed vehicle separates from the towing vehicle and a shunt operable to electrically couple a solenoid with a power source when actuated by the sensor, wherein the sensor is a logic circuit and the shunt is a MOSFET.

8. The assembly as set forth in claim 7, wherein the shunt is electrically connected between the power source and the solenoid such that current flows through the shunt to energize the solenoid when the towed vehicle separates from the towing vehicle.

9. The assembly as set forth in claim 7, wherein the harness provides substantially all of the towed vehicle's electrical interconnections with the towing vehicle.

10. The assembly as set forth in claim 7, wherein the harness provides only a portion of the towed vehicle's electrical interconnections with the towing vehicle.

11. The assembly as set forth in claim 7, further including an override operable to disengage the brakes while the towed vehicle is separated from the towing vehicle.

12. The assembly as set forth in claim 11, wherein the override automatically disengages the brakes once a time period has elapsed.

13. The assembly as set forth in claim 11, wherein the override prevents current from flowing through the assembly.

14. A breakaway device operable to engage a towed vehicle's brakes when the towed vehicle separates from a towing vehicle, the device comprising:
- a sensor operable to electrically detect an open circuit between the towed vehicle and the towing vehicle by detecting a loss of voltage in a wiring harness of the towed vehicle;
- a shunt actuated in response to the sensor and operable to electrically engage the towed vehicle's brakes; and
- an override operable to disengage the brakes while the towed vehicle is separated from the towing vehicle,
- wherein the override automatically disengages the brakes once a timer has lapsed.

15. The device as set forth in claim 14, the device comprising a transistor that electrically couples a power source and a solenoid of the brakes when a signal to the transistor is lost.

16. The device as set forth in claim 14, wherein the shunt is electrically connected between a power source and a solenoid of the brakes such that current flows through the shunt to energize the solenoid when the towed vehicle separates from the towing vehicle.

17. The device as set forth in claim 14, wherein the shunt is a relay which is electrically connected between a power source and a solenoid of the brakes such that current flows through the relay to energize the solenoid when the towed vehicle separates from the towing vehicle.

18. The device as set forth in claim 14, wherein the sensor is a coil of an electro-mechanical switch and the shunt is a set of contacts of the switch controlled by the coil such that the contacts close when current flow through the coil is lost.

19. The device as set forth in claim 14, wherein the override prevents current from flowing through the device.

20. An assembly operable to be installed on a towed vehicle with electrically controlled brakes and receive signals from a towing vehicle, the assembly comprising:
- a wiring harness operable to be physically secured to the towed vehicle;
- a plug operable to electrically couple the harness with the towing vehicle;
- a breakaway device operable to monitor an electrical condition of the harness and engage the brakes when the plug becomes disconnected from the towing vehicle;
- a transistor for electrically coupling a solenoid with a power source when the signal is lost; and
- an override operable to disengage the brakes while the towed vehicle is separated from the towing vehicle,
- wherein the override automatically disengages the brakes once a time period has elapsed.

21. The assembly as set forth in claim 20, wherein the assembly comprises a sensor operable to electrically detect when the towed vehicle separates from the towing vehicle and a shunt operable to electrically couple a solenoid with a power source when actuated by the sensor.

22. The assembly as set forth in claim 21, wherein the shunt is electrically connected between the power source and the solenoid such that current flows through the shunt to energize the solenoid when the towed vehicle separates from the towing vehicle.

23. The assembly as set forth in claim 21, wherein the shunt is a relay which is electrically connected between the power source and the solenoid such that current flows through the relay to energize the solenoid when the towed vehicle separates from the towing vehicle.

24. The assembly as set forth in claim 21, wherein the sensor is a coil of an electro-mechanical switch and the shunt is a set of contacts of the switch such that the contacts close when current flow through the coil is lost.

25. The assembly as set forth in claim 20, wherein the harness provides substantially all of the towed vehicle's electrical interconnections with the towing vehicle.

26. The assembly as set forth in claim 20, wherein the harness provides only a portion of the towed vehicle's electrical interconnections with the towing vehicle.

27. The assembly as set forth in claim 20, wherein the override prevents current from flowing through the device.

* * * * *

UNITED STATES PATENT AND TRADEMARK OFFICE
CERTIFICATE OF CORRECTION

PATENT NO. : 7,273,260 B2  
APPLICATION NO. : 10/365905  
DATED : September 25, 2007  
INVENTOR(S) : Jonathan S. Gray It is certified that error appears in the above-identified patent and that said Letters Patent is hereby corrected as shown below:

Column 7, Claim 7:  
line 10, "the towing; and" should read --the towing vehicle; and--.

Signed and Sealed this

Eighteenth Day of December, 2007

JON W. DUDAS  
*Director of the United States Patent and Trademark Office*